United States Patent [19]

Barney et al.

[11] Patent Number: 4,907,280
[45] Date of Patent: Mar. 6, 1990

[54] SLIDE SCANNER

[76] Inventors: Howard H. Barney, 2237 Carlton St., Berkeley, Calif. 94704; Kent S. Johnson, 1525 Ada St., Berkeley, Calif. 94703

[21] Appl. No.: 76,885

[22] Filed: Jul. 22, 1987

[51] Int. Cl.$^4$ .............................................. G06K 9/00
[52] U.S. Cl. ....................................... 382/1; 356/404; 356/418; 358/75; 358/901; 382/56; 382/67
[58] Field of Search ......................... 382/1, 65, 67, 56; 358/44, 75, 901, 76; 356/404, 418

[56] References Cited

U.S. PATENT DOCUMENTS

| | | | |
|---|---|---|---|
| 4,413,276 | 11/1983 | Hertz et al. | 358/75 |
| 4,490,740 | 12/1984 | Moriguchi | 358/75 |
| 4,646,252 | 2/1987 | Terashita | 382/1 |
| 4,674,834 | 6/1987 | Margolin | 358/901 |
| 4,736,251 | 4/1988 | Sasaoka | 358/75 |
| 4,748,680 | 5/1988 | Margolin | 382/65 |

Primary Examiner—Leo H. Boudreau
Attorney, Agent, or Firm—Christie, Parker & Hale

[57] ABSTRACT

A color slide transparency scanner projects an intense stripe of light through a color slide. Red, green, and blue filters successively filter the stripe of image from the slide. In some applications, a neutral density filter adds still more information from dark areas of the slide image. A carriage carrying the slide moves across the light. A CCD array detects the filtered images and converts them to analog electrical signals. Circuitry converts the analog signals to digital.

28 Claims, 11 Drawing Sheets

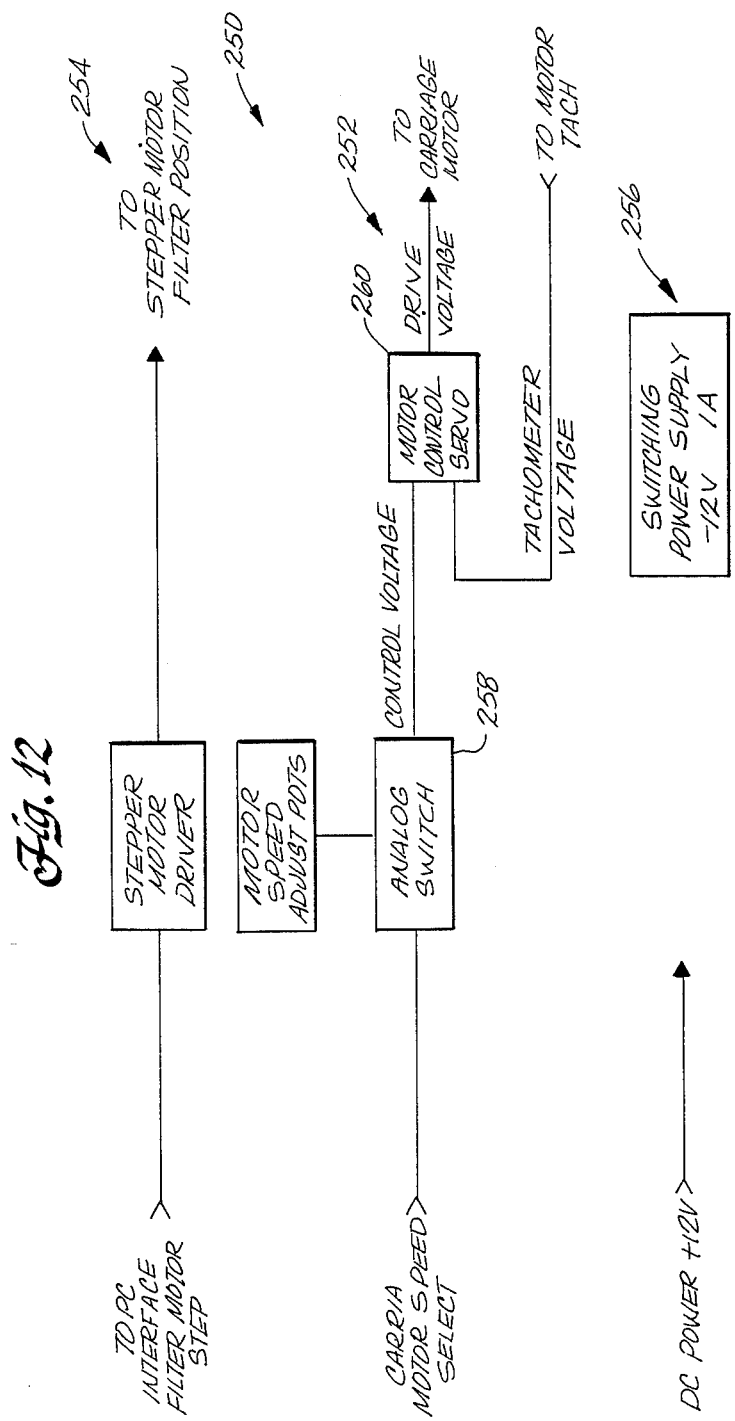

SLIDE SCANNER

BACKGROUND OF THE INVENTION

The present invention relates to a scanner that converts analog information of a 35MM color transparency (slide) into digital information for storage in a computer memory.

Photographic images accessible to computer users can enhance and improve a large spectrum of business, professional, educational, and scientific activity. By way of example, design professionals use photographic images as a point of departure for computer-aided design: for an architect, the photographic image may be of a site for a home or a building; for a product designer, the photographic image may be of a precursor product; for a package designer, the photographic image may be of a grocery store rack. Photographic images may also provide elements of a design: a landscape architect can work from an image data base of terrain, plants, and neighboring structures; an architect can work from an image data base of different materials in different colors and textures; a designer can create the outline of a proposed object and instruct a computer to fill in the outline with the color and texture of the materials selected from the computer's image data base.

Current devices that convert color photographic images into digital information capable of storage in a computer have shortcomings. Digitizing cameras scan photographic objects and provide digital information of high resolution. But the resolution comes at a high price. Reasons for the high cost include the requirements of a heavy camera stand to hold the camera steady and a separate illumination system and color separation filters. Digitizing cameras also need trained operators, plenty of room, and virtually a vibration-free environment; any significant vibrations during an exposure will ruin a scan. Video cameras can shoot slides and convert the image to digital signals by standard "frame grabbers". While inexpensive, the quality of the image retrieved is intrinsically limited, since the electronics of video produce geometric distortions and limited resolution.

Ideally, an analog-to-digital slide scanner produces high-quality, digital information from a slide quickly, easily, and at modest cost.

SUMMARY OF THE INVENTION

The present invention provides a slide scanner that converts analog information of a color slide transparency into digital information suitable for storage in a computer memory easily, quickly and at modest cost.

The present invention has means for producing a thin stripe of intense light that projects through a corresponding stripe in color slide transparency to produce a stripe of light information from the slide. A slide carriage mounts the slide and moves across the path of the thin stripe of light. Red, green, and blue filters are sequentially presented to the stripe of light to develop filtered light signals that strike a detector. The detector converts the light signals to analog signals that, in turn, are converted to digital signals that are stored in a computer. The light signals from the red, green, and blue filters strike the detector in exactly the same places.

In greater detail, the invention transports a slide across a narrow slice of light projected from a stationary fiber optic bundle and projects the analog information from the slide onto a stationary array of charged coupled devices (CCDs). Light projects successively through red, green and blue filters. Preferably a fourth scan through a neutral density filter brings out information from shadowy areas of the slide otherwise lost in conversion from light information to voltage signals in the CCDs. A detector board reads the voltage signals in the CCDs. Circuitry on the board converts the analog signals into digital signals. The digital signals are suitable for storage in a small computer memory.

In a detailed form, the detector board behind the CCD array processes, buffers and digitizes the analog signal received from the CCD array using standard circuitry. This circuitry has a preamplifier, a sample-and hold amplifier, and an analog-to-digital converter. The digital data is buffered prior to storage in a computer, such as an IBM PC/AT. The filtered image from the slide develops a set of three color analog signals: red, green, and blue, not necessarily in that order. The red filter intercedes light projected from the slide ahead of the CCD array and passes only red light to the array; the other two filters do the same thing with their colors. Red light falls on the CCD array for the shortest period of time, green light falls on the array the next shortest, and the blue light the longest. This permits proper response by the CCD array to the different colored light striking it.

The fourth filter that brings out details in shadow not brought out by the other three filters takes advantage of the fact that color information in shadow is not important, only brightness is important. Typically, the limit for resolution of the CCDs in shadow is about 2 optical density (OD). The fourth, neutral-density filter has an optical density chosen so that, at maximum scan speed, the CCDs are over exposed by a factor of 10 or more. Over exposure washes out images in the bright areas, but properly exposes images in the dark shadows. Thus, when a slide is scanned, four images are recorded: red, green, blue, and overexposed gray. This technique combines nicely with the CCDs because overexposed CCD pixels do not bleed into neighboring pixels; they do not spread and destroy information on properly exposed pixels.

An important feature of this invention is moving the slide with a slide carriage and drive. Preferably, a rotating shaft translates the slide carriage by driving four skewed followers on the carriage to develop both tangential and axial components of force and, consequently, motion. The weight of the carriage on the followers is the only force on the followers and their position is dependent on no other force; unlike a three roller follower system where springs load the followers. The followers alone orient the carriage on the shaft so that radial alignment of the carriage with respect to the shaft automatically results and the plane of the slide holder in the carriage always contains the axis of the drive shaft. An outrigger from the carriage mounts a roller to track on a guide bar mounted parallel to the drive shaft to react through the guide bar torque applied to the carriage by the drive shaft. A reticle and a photo detector provide encoder signals that register the slide with respect to the CCD array for each scan of the different filters. The filter and a projecting lens assembly are commonly mounted to a base and can be moved with respect to the slide for focus.

A fiber optic bundle illuminates the slide. The bundle brings light from a rear-mounted, fan-cooled halogen bulb to the front of the scanner. The array changes in cross-sectional shape from round at its beginning to a thin, vertical rectangle at its end so that an intense rectangular stripe of light passes through the slide onto the CCD array.

These and other features, aspects, and advantages of the present invention will become more apparent from the following description, appended claims, and drawings.

BRIEF DESCRIPTION OF THE DRAWINGS

FIGS. 9 through 12 schematically show the electronic control circuitry, motor drive circuitry, digitizing circuitry, and computer interface circuitry of the invention.

DESCRIPTION OF THE PREFERRED EMBODIMENT

Figure 1:
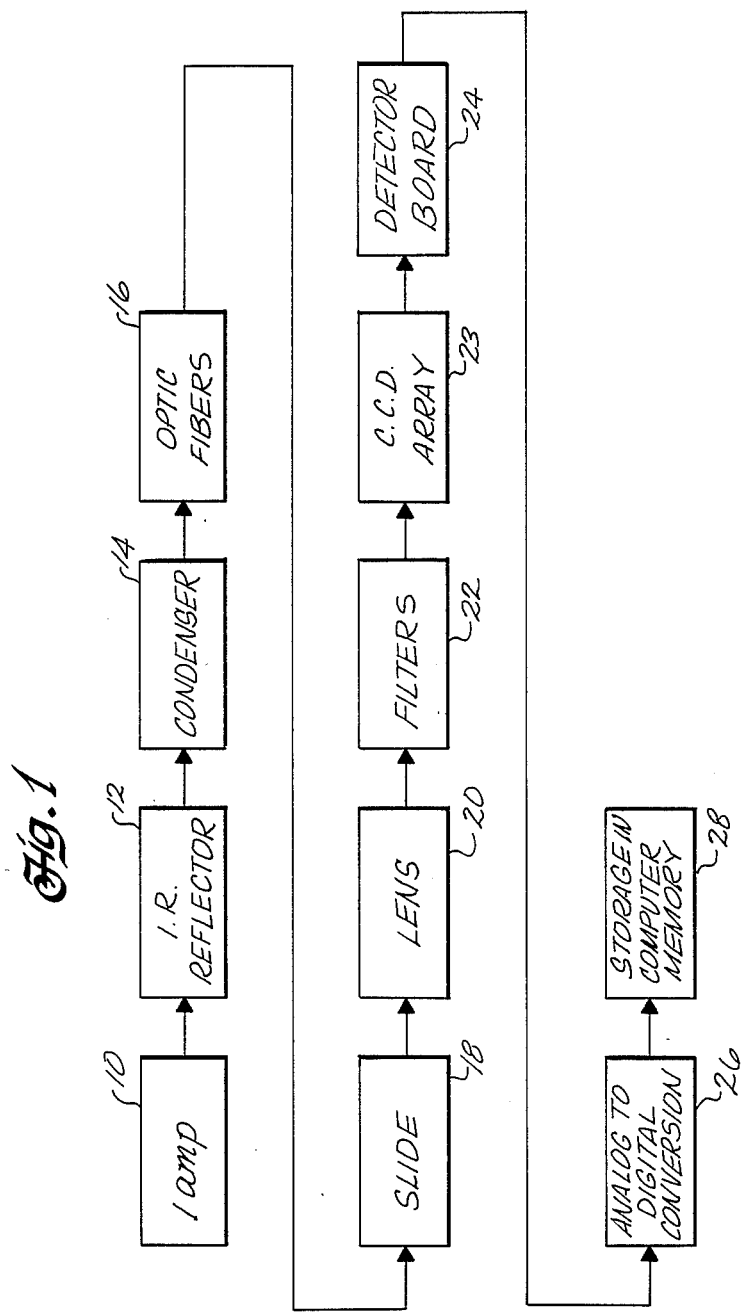
FIG. 1 is a schematic diagram of some of the principal components of the scanner of the invention to illustrate the general principles of the invention.

FIG. 1 illustrates schematically the development of digital information corresponding to analog information of a color slide in accordance with the present invention. A light beam from a halogen lamp 10 passes through an infrared filter 12 that reflects unwanted infrared energy and removes it from the beam. Light from the filter passes through a condenser lens 14 where it is concentrated and directed into a bundle of optical fibers 16. The optical fiber bundle is cylindrically shaped at its entrance and changes into a thin, rectangular slice at its end. The optical fibers lead from the rear of the scanner in proximity to the heat of the lamp to direct a slice of intense light on a slide 18 at a cooler location removed from this heat.

The slide moves across the light at a predetermined rate that varies for each pass. The mechanism that does this includes a carriage that mounts on a rotating drive shaft through driven rollers that constrain the carriage in two of the three linear degrees of freedom; an outrigger constrains the carriage in the third degree of rotational freedom. And so the carriage moves only in a path parallel to the drive shaft axis and no distortion causing movement can occur.

A lens 20 permits adjustments to optical magnification, which is usually near one-to-one. The lens can be moved with respect to the slide to permit focus, to correct for bowed or different thickness slide mounts.

Light from the lens passes successively in time through at least three filters in a filter assembly 22 to produce red, blue and green analog image information. Optionally, a fourth filter picks up information in dark areas of the slide that would not otherwise resolve in the pixels of CCD array 23. Light from the filters passes into the CCD array to develop electrical analog signals corresponding to the light information striking the array.

A detector board 24 on the back of the CCD array detects these electrical signals. Signals from the detector are further groomed and digitized in analog-to-digital circuitry, indicated at 26. This circuitry, in general, buffers the analog signals from the CCD array, and digitizes the signal, and includes a preamplifier, a sample-and-hold amplifier, and an analog-to-digital converter. The digital data is buffered and sent to an interface card in a computer, as indicated at 28. The circuitry also includes timing and control chips for the CCD array, interface chips for a linear encoder, and home bit flags.

The successively filtered analog signals from the slide change light information into electrical information through CCD array 23. Signals corresponding to red, for example, appear in pixels in the CCD array as a function of voltage. Detector 24 picks these signals up and the signals are ultimately stored as separate signals in the computer memory. Signals corresponding to blue light and signals corresponding to green light, similarly, are separately detected, converted and stored. When the neutral density filter is used to bring out information in dark image areas of a slide, these signals, too, are detected in the CCD array as voltage signals, digitized and stored in a computer memory. A software program then converts the resulting stored signals into an image on a computer screen.

The face of the optical fiber bundle 16 receiving the light from condenser 14 is polished. The bundle at its entrance is approximately cylindrical to correspond to the concentrated, cylindrical beam received from condenser 14. Optical fibers lead from the rear-end of the scanner to its front-end and change in overall cross-sectional perimeter from cylindrical to a narrow slit at the outlet of the fiber bundle.

The analog signal from slide 18 passes into lens 20, which provides a focusing adjustment onto the face of the CCD array.

A step motor drive positions filters of the filter assembly to intercept light from lens 20 at appropriate times and duration, the duration being correlated to the ability of the CCD array to develop appropriate voltage signals for the color of light striking its pixels at close to saturation, longer for blue than for green, and longer for green than for red.

Because the slide is scanned at least three times, and preferably four, the light signals from the same areas of the slide must register on the same pixels of the CCD array so that they superimpose on each other. This registration occurs through information provided by a feedback loop.

FIGS. 2 through 12 shows the specifics behind the generalities just described.

Figure 2:
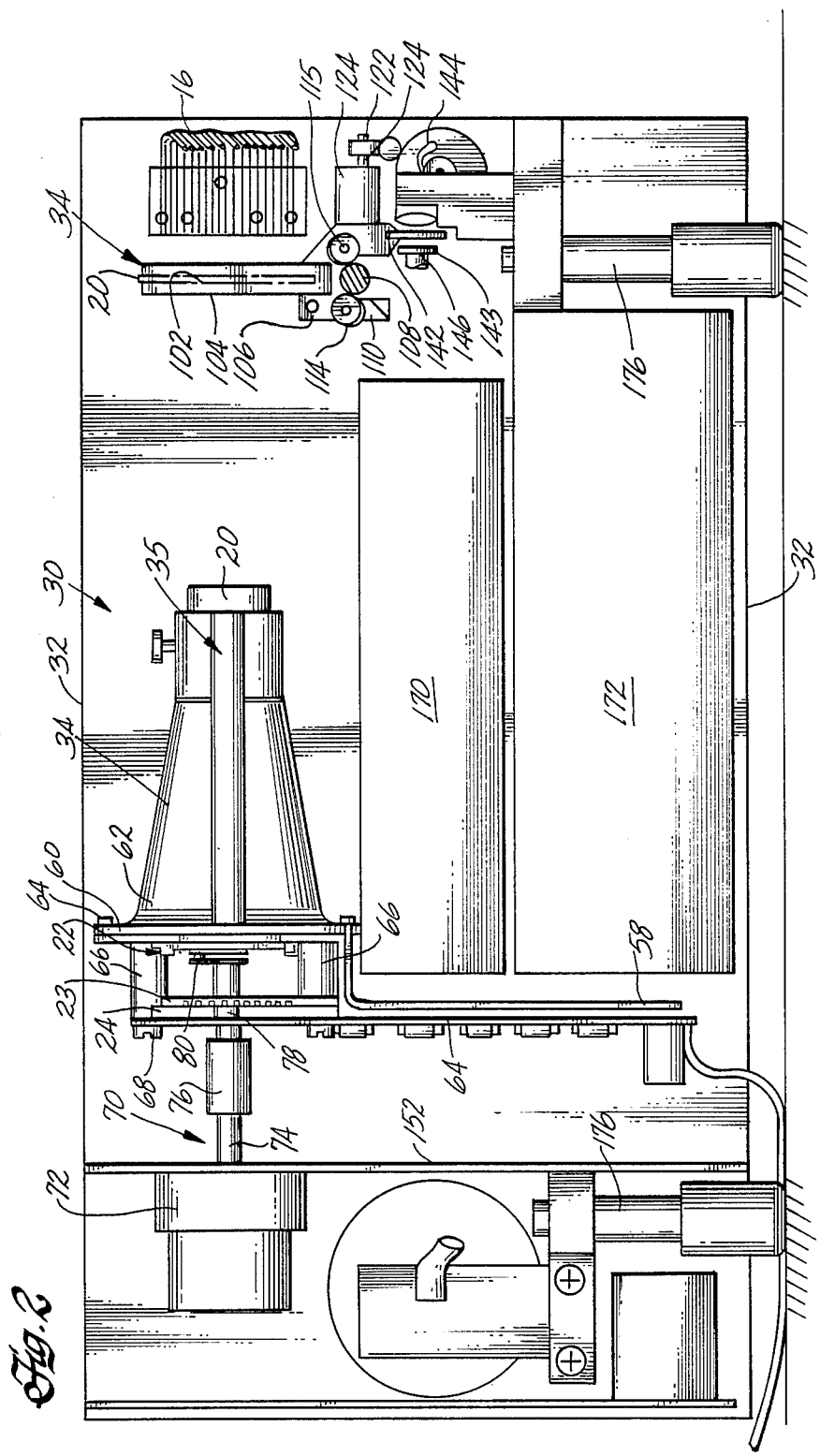
FIG. 2 is a side elevational view of the scanner with a side wall removed.
Figure 3:
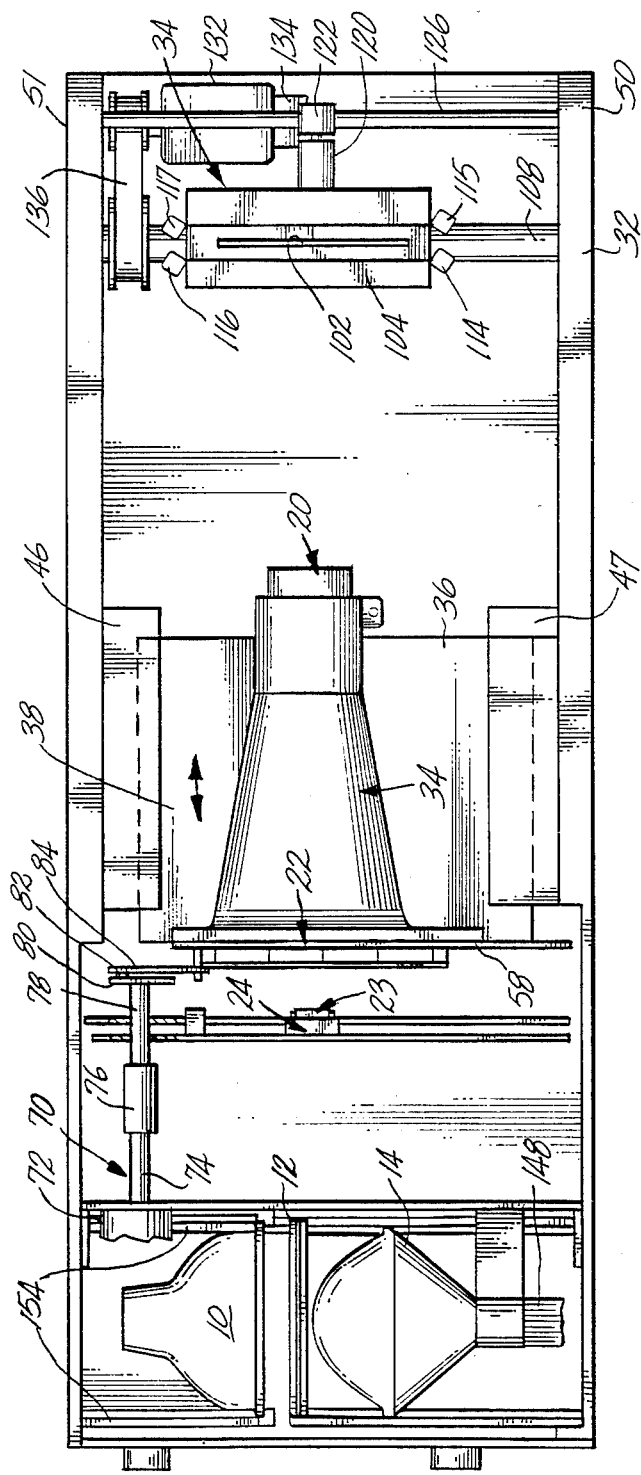
FIG. 3 is a top plan view of the scanner, partly broken away, partly in section and with a cover removed.
Figure 4:
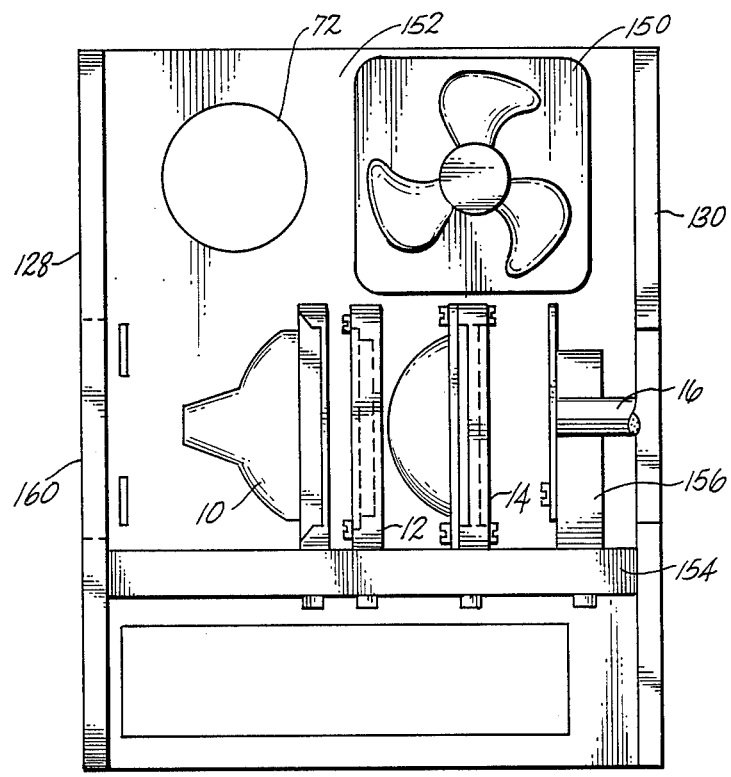
FIG. 4 is a rear elevational view of the scanner.
Figure 7:
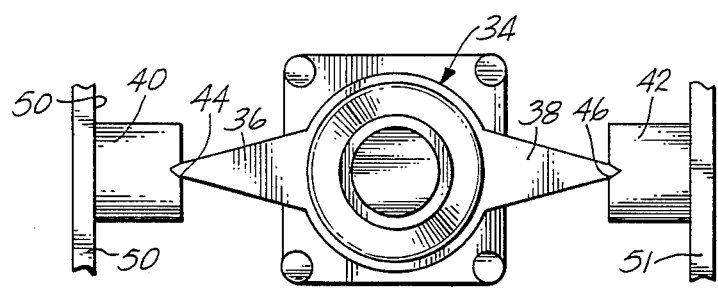
FIG. 7 is an elevational view of the lens assembly and mount.
Figure 8:
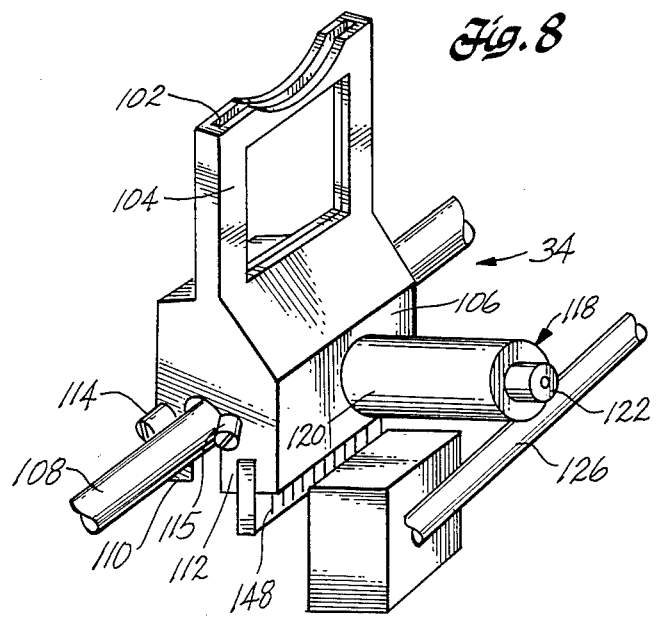
FIG. 8 is a perspective view of the slide carriage and mount.

FIGS. 2 and 3 show the juxtaposition of the components of a scanner 30. The scanner includes a base 32. A slide carriage 34 mounted on the base moves a slide in a single, straight line direction in a plane normal to the plane of FIGS. 2 and 3: into and out of FIG. 2 and up and down in FIG. 3. A lens assembly 34 mounts on base 32 for movement to the left and right in FIGS. 2 and 3. The same assembly carries filter assembly 22. Support for the lens and filter assemblies from the base is shown in FIGS. 3 and 7. Lens assembly 34 mounts through opposed arms 36 and 38 to base 32. The base mounts tracks 40 and 42 that have opposed V-shaped grooves 44 and 46, respectively. The ends of the arms have shapes that mate with the grooves so that the lens assembly moves only linearly towards and away from CCD array 23 because of the constraints of the tracks. The tracks mount on walls 50 and 51 on the base. With reference to FIG. 3, the lens assembly in plan has arms 36 and 38 extending like wings to their tracks 40 and 42. The wings extend fore and aft substantially the entire length of the lens assembly. Filter assembly 22 attaches to lens assembly 34 through a stepped, mostly upright support 58 of the lens assembly, seen best in FIGS. 2 and 9. The support attaches to a perimeter flange 60 of a lens conical housing 62 of the lens assembly by fasteners 64. Filter assembly 22, in turn, attaches to support 58, as by fasteners, so that the filter assembly and the lens assembly travel as a unit.

As seen in FIG. 2, a printed circuit board 64 mounts CCD array 23 and detector 24. The board attaches to lens assembly 34 with fasteners 68 that screw into threads in perimeter flange 60. Standoffs 66 space the board from the filter and lens assembly. The board travels with the lens assembly when adjusting focus so that image magnification on the CCD array does not change.

Figure 6:
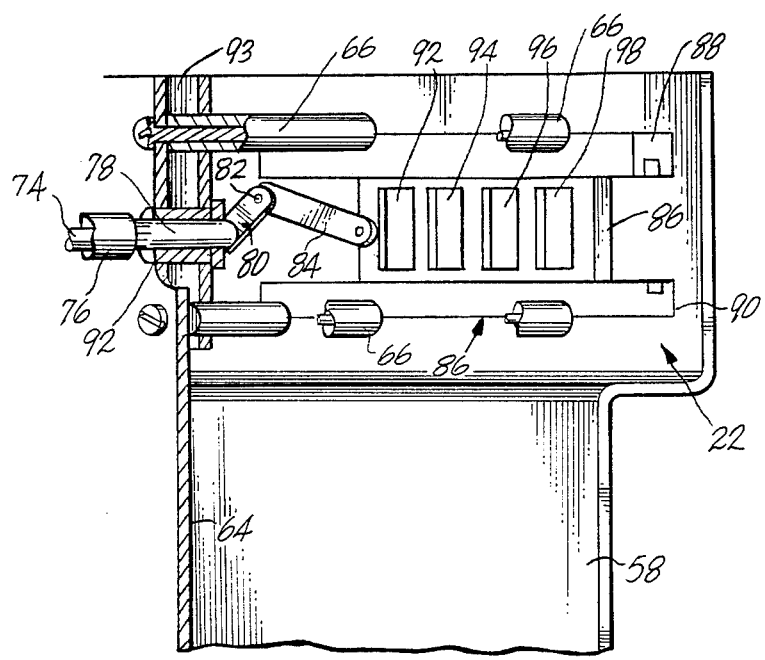
FIG. 6 is a perspective view of a portion of the filter positioning assembly.

As seen in FIGS. 2, 3, and 6, a stepping motor drive 70 begins with a stepping motor 72 that has an output shaft 74. A splined coupler 76 couples the output shaft to a complementary splined driven shaft 78. A throw 80 attached at the extreme outer end to the driven shaft rotates with the shaft. A connecting pin 82 at the outer end of the throw drives a link 84. The link attaches to a filter carrier frame 86 that in turn tracks in opposed channel guides 88 and 90 for reciprocal, linear movement between distinct stations in the path of light coming from lens 20. A bushing 92 journals shaft 78, and the busing passes through board 64 and mounts on a plate 93 carried by two of the standoffs.

FIGS. 2, 3, 5 and 8 show slide carriage 34 best. The carriage has an upright slide receiving pocket 102 in an upstanding frame 104. The frame extends upwardly from a carriage base 106 that has a dimension in planes parallel to the plane of movement of the lens and filter assemblies larger than the slide frame. The base straddles a drive shaft 108; legs 110 and 112 of the base effecting the straddle. Four rollers 114, 115, 116 and 117, mount to the base and rest on drive shaft 108. These rollers are skewed slightly relative to the axis of the drive shaft so that rotation of the drive shaft produces an axial component of force on the rollers that in turn moves the slide carriage along the shaft. An outrigger 118 has an arm 120 and a roller 122 mounted through a pin 124 to the arm. The roller bears on a guide shaft 126 that parallels drive shaft 108. The guide shaft reacts to the torque applied to the carriage through the rollers from shaft 108 and keeps the carriage from turning with the drive shaft. The drive shaft and the guide shaft mount in vertical walls 50 and 51 of the base. A carriage drive motor and tachometer 132 and 134 mounted on base 32 drive shaft 108 in rotation through a belt and pulley drive 136 between the motor and the drive shaft.

Rollers 114 through 117 orient the carriage on drive shaft 108 and determine the position of the carriage with respect to the axis of the drive shaft in a vertical and horizontal planes containing the axis of the drive shaft, respectively, and permit movement along the shaft. The rollers also prevent carriage rotational movement in these planes. The outrigger prevents carriage rotational movement in the normal plane to the drive shaft axis. A drive is known that uses the skewed roller principle, but it has three rollers at each end of the carriage is known. The three roller drive uses spring force to position the rollers relative to the drive shaft. This mounting can produce carriage horizontal and vertical skewing with respect to the drive shaft because of slight variations in the roller positions produced by slight variations in the amount of spring force between the rollers and the drive shaft. With two rollers per side and with the force of engagement between the rotating shaft and the rollers dependent only upon carriage weight, the location of the rollers is not a function of spring force, and alignment of the slide carriage with the axis of the shaft is easier.

Figure 5:
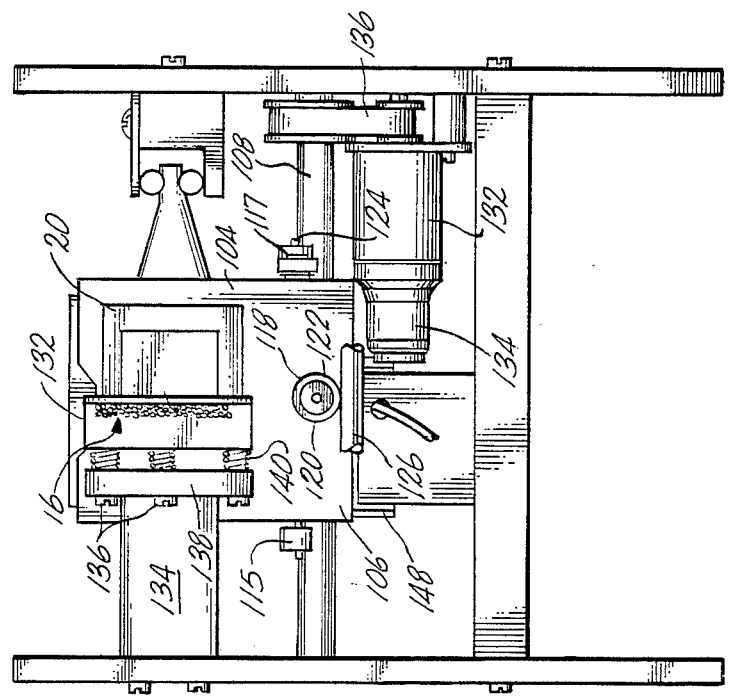
FIG. 5 is a front elevational view of the scanner with a front wall removed.

With reference to FIG. 5, fiber optic bundle 16 presents at its discharge end a long and narrow rectangle 130 to present a slice of light to a slide. The fiber optic bundle is held by a block 132, which in turn mounts to a fiber optic bundle mounting bracket 134 through fasteners 136 bearing on a terminal flange 138 of the bracket. To adjust for vertical orientation and to be sure that the orientation does not change, springs 140 between the terminal flange and the mount increase friction between the flanks of the threads of the fasteners and the mount.

FIGS. 2 and 5 show the means of generating position encoder signals for the slide carriage. This means generally have a grated scale 142, reticle 143, a light source 144, a collimating lens, and a feedback photo-diode, silicon detector 146. The light source is a fiber optic strand from the fiber optic bundle. Grated scale 142 is carried by the carriage. A stationary reticle in the path of light from the fiber optic strand has the moving scale pass behind it to generate a sinusoidal signal in the silicon detector, the frequency of which is a function of carriage displacement. A simple circuit counts the cycles picked up by the silicon detector and generates appropriate control signals, as will be discussed a little later.

The optical fiber bundle leads to its outlet 130 from an inlet 148 (see FIGS. 3 and 4) in the rear of the scanner. Halogen lamp 10 directs light through infrared filter 12, from there the light passes into condenser 14 that focuses the light and directs it to the input of the fiber optic bundle. A fan 150 (not shown in FIG. 3) cools the halogen lamp. A wall 152 compartmentalizes the light, infrared filter condenser, fan and stepping motor 72 to keep the heat of the lamp and motors from getting into the balance of the scanner. Fan 150 and motor 72 mount on wall 152. Parallel cross rails 154 between walls 128 and 130 mount the lamp, filter, condenser and a fiber optic mounting bracket 156. A lamp access port 160 in wall 128 permits easy access to the lamp.

Power supplies 170 and 172, shown in FIG. 2, mount on base 32. Power supply 172 is a 12 volt switching supply that provides regulated DC voltage for the lamp, motors and fan. Power supply 170, located above power supply 172, is a 5 volt and ±12 volt linear supply that provides logic voltages and clean analog supplies to the analog section of the detector board.

Vibration isolators 176 between ground and the corners of base 32 minimize the effects of external vibration. The cooling fan is shock mounted to wall 152 to minimize fan vibration.

FIGS. 9 through 12 show the circuitry of the present invention. An overview helps to understanding it. Before scanning a slide, the carriage must be homed, the proper filter selected, and the exposure time set. Starting motor 132, homes the carriage, and when it is home, a home flag indicates this fact. Stepping motor 72 steps the filters until they reach home; further operation of the motor steps the filters until the right one is in position. The exposure time is set by writing an exposure time value into an expose time register. Next, the carriage motor is set to run at its highest forward speed. Encoder pulses from silicon detector 146 are counted to find the start of the image area of the slide. An encoder pulse is generated with a predetermined travel of carriage 34, 0.001 inches being a typical travel distance. When the slide image area is reached, a scan can begin. Scanning of each slice of the slide begins only upon a transition signal from the encoder, a signal that the carriage has moved 0.001 inches. Upon sensing the transition signal, the interface board generates a start read signal that begins a scan sequence. At the end of a scan sequence, data is clocked into a FIFO buffer and then read into the computer. And then the second scan sequence of the next 0.001 inch slice begins.

Figure 9:
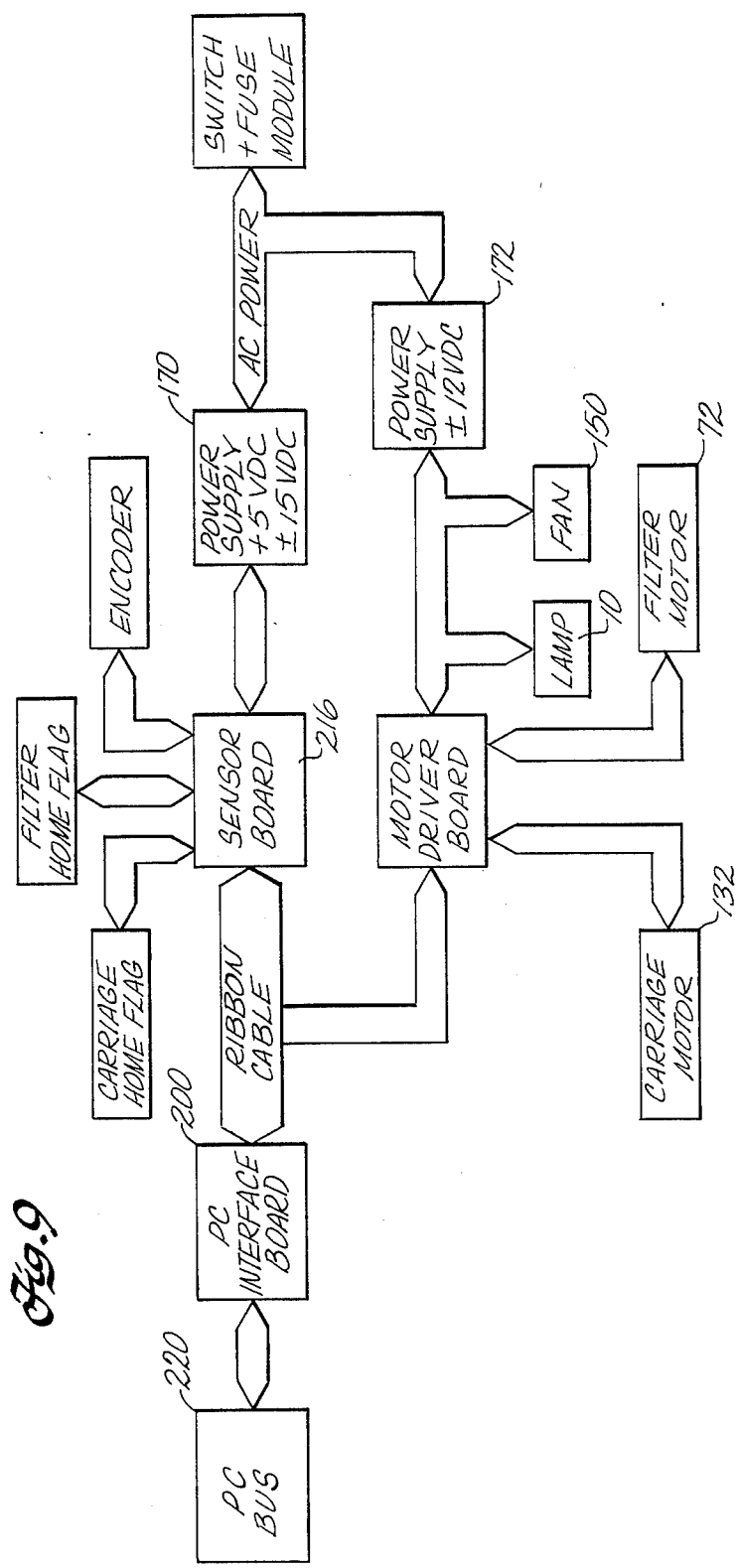

FIG. 9 is a block diagram of the electronics and is useful in relating the subsequent diagrams. It requires no further comment.

Figure 10:
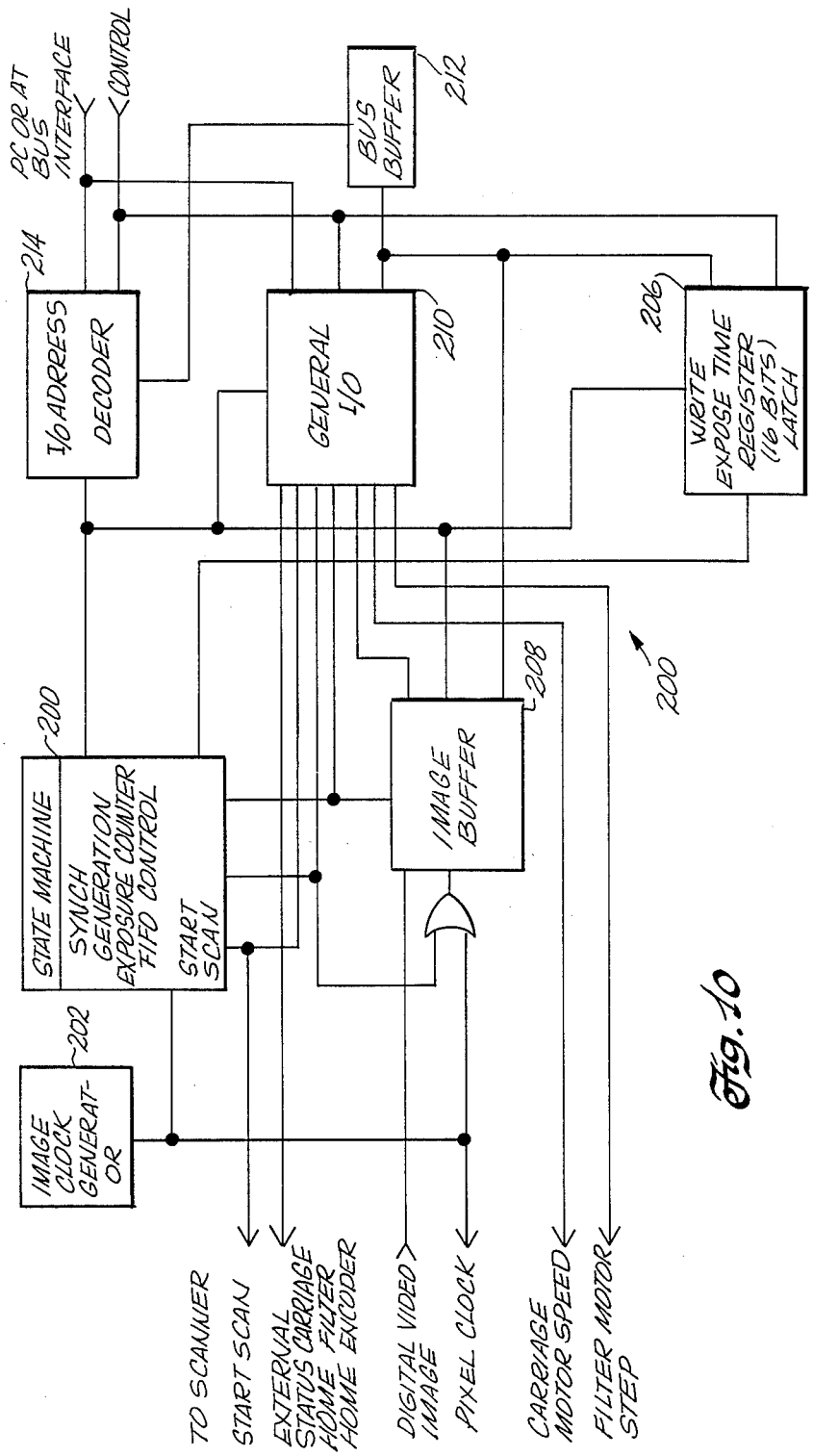

FIG. 10 shows a block diagram of a computer interface board 200 (PC interface board), the electronics that interface the scanner with a personal computer. The PC interface board has all digital components, and it contains as much of the digital electronics as possible. The analog circuitry is separate from this digital circuitry. The separation isolates noisesensitive analog circuits from noisy digital circuits.

The PC interface board includes a clock generator 202, a state machine 204, an expose time register 206, a FIFO (first-in, first-out) buffer 208, a general purpose parallel in-out (I/O) buffer 210 (8255A), a bus interface 212, and an I/O address decoder 214.

Clock generator 202 is two one-shot timers connected together. It runs in the range of 300 KHz to 1 MHz. Two pots set the frequency and duty cycle, for example, 480 KHz and 30% duty cycle.

State machine 204 generates the control signals used on the rest of the interface board. It includes a 16-bit expose time counter, several flip-flops, and other discrete logic. Inputs to the state machine are the clock signal, a start read pulse, and a 16-bit expose time signal. Outputs are FIFO clear, FIFO fill, start scan, and cycle signals.

The start read pulse comes from I/O address decoder 214 in response to an output instruction from the host computer. When the state machine receives this pulse, it starts an input cycle. The first thing that happens is that the start read pulse is synchronized with the clock signal. After synchronization, the start read pulse starts the expose time counter and generates the first of two start scan pulses sent to a sensor board 216.

The value in the expose time register 206 is loaded into the expose time counter of the state machine. The counter counts off the expose time interval. It counts two intervals during the exposure process. At the end of the first expose time interval, an end-of-count signal generates a second start scan pulse to the sensor board, restarts the counter, clears the FIFO, and sets FIFO fill enable to start loading image data into the FIFO. At the end of the second exposure time interval, FIFO fill enable is cleared.

Expose time register 206 consists of two 8-bit latches that hold the expose time that the CCD array is exposed to light. The expose time is written directly from the PC bus 220 (see FIG. 9) by an output signal to two I/O ports of the register.

Image buffer FIFO is a 1024×9 first-in, first-out buffer. This buffer stores the digitized image signal before it is read by the computer. The buffer allows the sensor board to generate data asynchronously and at a different data rate from the data rate being read by PC interface bus 220.

The input to the FIFO is from an analog to digital converter on sensor board 216. A write clock is taken from the image clock generator 202 and gated with the FIFO fill enable signal from the state machine. The output from the FIFO is to bus buffer 212, clocked off a read signal from I/O address decoder 214.

General purpose buffer 210 is an LSI chip that has three 8-bit parallel I/O ports. One of these ports reads interface board status signals—start read synch, cycle, FIFO clear, FIFO fill, FIFO empty, FIFO half-full, FIFO full. A second port is an output port used to control the filter and carriage motors. A third port reads external status—carriage home, filter home, and carriage encoder signals.

The interface board is controlled by signals from the computer data, address, and control busses. Bus transceiver 212 buffers the data bus on and off the board. Address decoder circuit 214 generates the I/O read and write strobes needed by the board. The board maps into eight I/O addresses, with the base address selected by a DIP switch.

The interface board has a card edge connector to the computer bus, and a ribbon cable connector to a sensor board and a motor driver board. The bus connector carries power, address, data, and control signals. The ribbon cable carries clocks and a start scan signal to the sensor board. It returns signals for 8-bit digital video signal, carriage home, carriage end (not used), filter home, and carriage position (TTL encoder). To the motor driver board, the ribbon cable carries carriage motor control and filter step signals.

Figure 11:
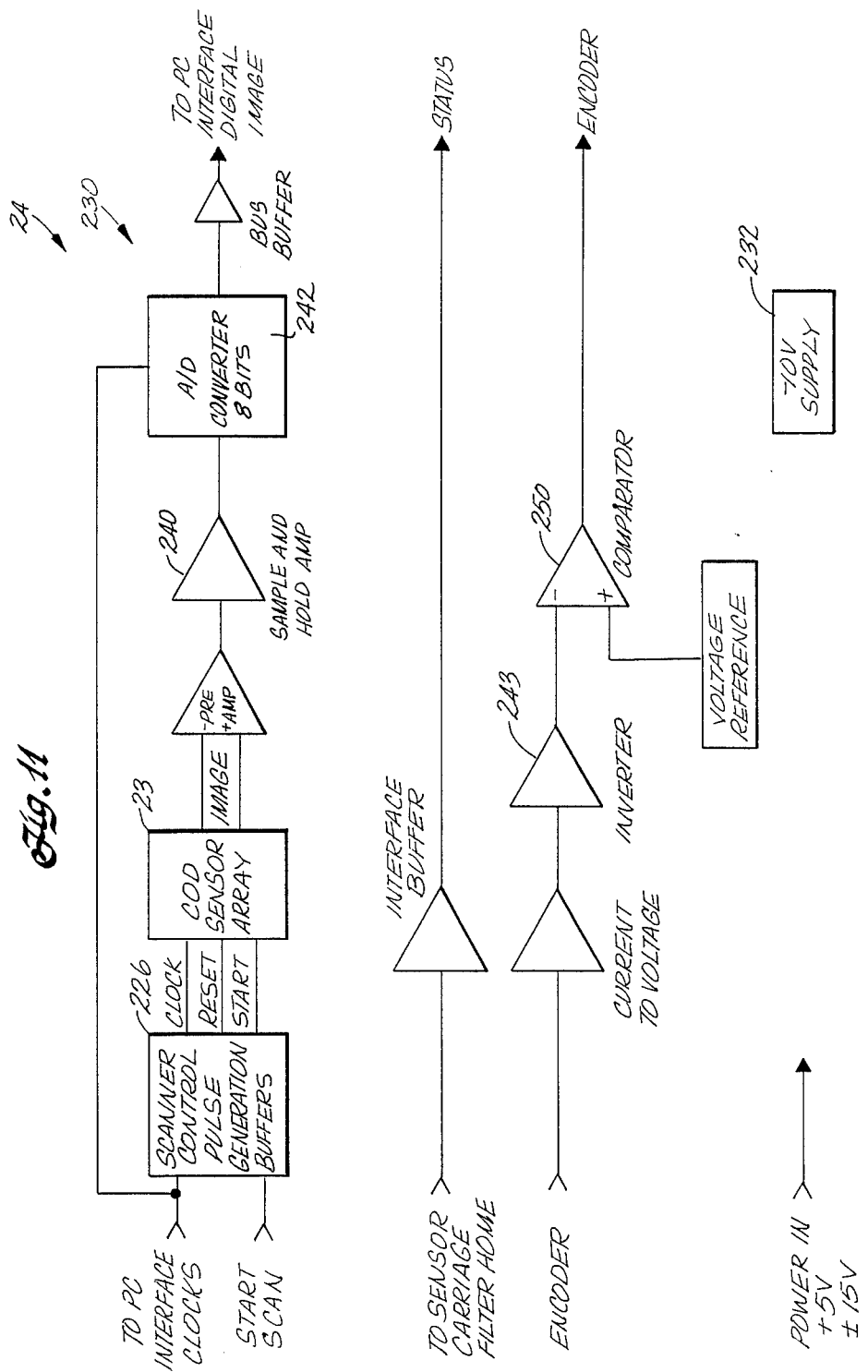

With reference to FIG. 11, detector sensor board 216 (shown alternatively as 24) has very low noise to prevent disruption of the image signal and is small enough to fit in the scanner enclosure. Major subsections of the detector board are a scanner interface 230, a -10-volt power supply 232, and a status flag interface 234.

The scanner interface is the heart of all the electronics of the scanner. The inputs to this interface are a clock and start scan signals from the interface board and the output is digitized image data. T h e clock and start signals are fed into a control circuit 236 to make the pulses needed by CCD scanner array 23. Scanner 23 is a 1024-element CCD sensor array made by EG&G Reticon. Its differential output is fed through a preamplifier 238, a sample-and-hold amplifier 240, and an analog-to-digital converter 242 to produce an 8-bit digital signal. Gain and offset of the analog signal are adjustable with pots to yield a 0-5V signal into an analog-to-digital (A/D) converter 242.

The scanner array, by its nature, is read and cleared in one operation. In this scanner, the first start scan is used to clear the array; the values it reads out are ignored. The second start scan is used to read out good image data. The timing between the two pulses determines the exposure of the array. This is varied by changing the value set in expose time register 206.

The power supply 232 is a simple linear power supply. It takes −15V from the board supply and makes −10V for the scanner chip.

Status flag interface circuit 234 is a simple interface circuit provided for three optical interrupters. Two are actually used for the carriage and filter home flags.

An interface is provided for silicon detector 146 used to measure carriage position. The interface contains two operational amplifiers 246 and 248 configured as a current-to-voltage converter and an inverter. The sinusoidal output of the inverter goes to a comparator 250 that converts it to a digital signal.

Sensor board 24 connects to the PC computer interface board through a section of ribbon cable. It receives clock and start scan signals and sends digital image and machine status signals over this cable. The board has separate connections to the optical interrupters that detect carriage and filter home, and to a photo-diode, the silicon detector, that senses the carriage position. Linear power supply 170 provides +5V and ±15V DC power.

FIG. 12 shows a motor driver board 250 that contains all the noisy analog circuits. This board is physically isolated from the sensor board and has its own 12V power. Major subsections of the motor driver board are a DC motor driver 252, a stepper motor driver 254, and a −12V switching power supply 256.

The DC motor driver circuit controls carriage drive motor 132. Four motor speed select signals from the interface board control an analog switch 258 that selects one of four adjustment pots. The voltage set on the pot controls an operational amplifier velocity servo 260 that generates the motor drive voltage. The motor includes a tachometer 134 that generates a DC voltage. This voltage is fed back into the servo to allow the servo to maintain a constant speed under varying load.

The stepper motor drive circuit controls filter motor 72. A step signal from the interface board is brought to a chip that controls the motor directly.

The −12V power supply, based on a Fairchild 78S40 switching regulator chip, makes the negative voltage needed to reverse the carriage motor.

Carriage motor speed select and filter step signals come from the interface board on a ribbon cable. The carriage motor and tach and the filter motor each have their own connections. Power comes in from the +12V switching supply, also used by the lamp and fan.

Linear power supply 172 provides +5V @2A, ±15V @0.4A and connects to the sensor board; the other power supply 170, a +12V @10A switching power supply, connects to the lamp, fan and motor driver board. Additional operating voltages are derived from these on the sensor and motor driver boards. The PC interface board is powered entirely from the PC bus.

The present invention has been described with reference to a preferred embodiment. The spirit and scope of the appended claims should not, however, necessarily be limited to this embodiment.

We claim:

1. A scanner that converts analog information of color slide transparencies into digital information for storage in a computer memory comprising:
   (a) means for producing a thin stripe of light much thinner than the length dimension of the slide;
   (b) a slide carriage for holding a slide;
   (c) means for moving the slide carriage along a line of movement across the thin stripe of light at predetermined speeds to produce projected analog images;
   (d) lens means in the path of the projected analog images for focusing such images;
   (e) red, green, and blue filters;
   (f) means for moving the filters sequentially into the projected analog images each for a different period of time to produce filtered analog images;
   (g) detector means for detecting the filtered analog images focused thereon by the lens means and generating corresponding electrical signals; and
   (h) means for converting the electrical signals into digital signals suitable for storage in a computer.

2. The scanner claimed in claim 1 wherein the detector means includes an array of CCD devices.

3. The scanner claimed in claim 2 wherein the different periods of time are a function of the responses of the CCD devices to red, green, and blue light.

4. The scanner claimed in claim 3 including a neutral density filter as one of the filters and the period of time for the neutral density filter produces an overexposed grey in the CCD array.

5. The scanner claimed in claim 4 wherein the means for producing a thin stripe of light includes a light source remove from the slide carriage and optical fibers in the path of light from the light source and having an outlet conforming to the thin stripe of light to produce the thin stripe of light.

6. The scanner claimed in claim 5 including means to move the lens and filters together towards and away from the CCD array without moving the slide carriage.

7. The scanner claimed in claimed 3 wherein the means for producing a thin stripe of light includes a light source removed from the slide carriage and the filters so that heat from the light source does not affect the slide or the filters and optical fibers in the path of light from the light source and having an outlet conforming to the thin stripe of light to produce the thin stripe of light.

8. The scanner claimed in claim 7 wherein the filter moving means includes means for stepping the filters one at a time into the projected analog images.

9. The scanner claimed in claim 8 including means to move the lens and filters together towards and away from the CCD array without moving the slide carriage.

10. The scanner claimed in claim 9 wherein the skewed rollers comprise at least two pairs of rollers mounted to the carriage at spaced apart locations along the line of movement with the two rollers of each pair resting on and straddling the drive shaft to support the weight of the carriage by the drive shaft with no forces other than the weight of the carriage and the drive forces of the drive shaft acting between the carriage and the drive shaft.

11. The scanner claimed in claim 9 wherein the means for moving the slide carriage includes a motor, a drive shaft driven by the motor in rotation, means to mount the drive shaft for rotation and with its axis parallel to the line of movement of the slide carriage and skewed rollers on the carriage and the drive shaft that impart linear motion to the carriage from the rotation of the drive shaft.

12. The scanner claimed in claim 11 including an outrigger on the carriage extending normal to the axis of the drive shaft and guide for the outrigger to bear on and react torque of the drive shaft imparted to the carriage.

13. The scanner claimed in claim 1 wherein the means for moving the slide carriage includes a motor, a drive shaft driven by the motor in rotation, means to mount the drive shaft for rotation and with its axis parallel to the line of movement of the slide carriage and skewed rollers on the carriage and the drive shaft that impart linear motion to the carriage from the rotation of the drive shaft.

14. The scanner claimed in claim 13 wherein the skewed rollers comprise at least two pairs of rollers mounted to the carriage at spaced apart locations along the line of movement with the two rollers of each pair resting on and straddling the drive shaft to support the weight of the carriage by the drive shaft with no forces other than the weight of the carriage and the drive forces of the drive shaft acting between the carriage and the drive shaft.

15. The scanner claimed in claim 13 including an outrigger on the carriage extending normal to the axis of the drive shaft and guide for the outrigger to bear on and react torque of the drive shaft imparted to the carriage.

16. The scanner claimed in claim 15 wherein the guide includes a guide shaft parallel to the drive shaft and the outrigger includes a roller engaging the guide shaft.

17. The scanner claimed in claim 1 wherein the means for producing a thin stripe of light includes a light source removed from the slide carriage and optical fibers in the path of light from the light source and having an outlet conforming to the thin stripe of light to produce the thin stripe of light.

18. The scanner claimed in claim 17, wherein the filter moving means includes means for stepping the filters one at a time into the projected analog images.

19. The scanner claimed in claim 18 including means to move the lens and filters together towards and away from the CCD array without moving the slide carriage.

20. A scanner that converts analog information of color slide transparencies into digital information for storage in a computer memory comprising:
(a) a base;
(b) a light source mounted on the base:
(c) a fiber optic bundle having an entrance and an exit and mounted to the base, the exit of the fiber optic bundle being in the shape of a long and narrow stripe to project a thin stripe of light from the light source;
(d) a slide carriage for holding a slide;
(e) means for moving the slide carriage linearly across the stripe of light;
(g) red, green, blue, and neutral density filters;
(h) a filter mount holding the filters for serial interception of images from a slide in the slide carriage projected by the stripe of light to create superimposable images;
(i) means to present each of the filters serially for the interception of the images and to produce filtered images, the presentation being for a period of time selected for each of the filters;
(j) a lens mounted to the base for movement towards and away from the CCD means and the slide carriage for focusing the image on the CCD means, the lens and the filter mount being coupled together for this movement;
(k) CCD detector means for detecting the images from the filters superimposed for each stripe and converting them into analog electrical signals, the different periods of time being a function of the response of the CCD detector means to the particular light striking it, the period of time for the neutral distance filter being sufficient to overexpose the CCD detector means except for shadowy areas of the slide; and
(l) means for converting the electrical analog signals into digital signals suitable for storage in a computer.

21. The scanner claimed in claim 20 including a light condenser between the light source and the entrance to the optical fiber bundle to concentrate the light entering the optical bundle.

22. The scanner claimed in claim 20 wherein the slide carriage moving means includes a drive shaft mounted to rotate on the base around an axis normal to the direction of projection, means to drive the drive shaft in rotation, and roller means coupling the carriage and the drive shaft to impart linear motion to the carriage upon rotation of the drive shaft.

23. The scanner claimed in claim 22 wherein the roller means includes at least two pair of skewed rollers mounted at spaced apart locations along the drive shaft to the carriage in position to transmit the weight of the carriage to the drive shaft, the rollers being the only things that transmit forces between the drive shaft and the carriage.

24. The scanner claimed in claim 23 wherein the filter presentation means includes a stepper motor and drive coupled to the filter mount to progressively step each filter for the interception of the images.

25. The scanner claimed in claim 24 wherein the lens is mounted in a lens assembly having opposed wings that guide on linear tracks attached to the base.

26. The scanner claimed in claim 25 wherein the linear tracks restrain the lens assembly in all but one degree of freedom.

27. The scanner claimed in claim 24 wherein the stepper motor and drive includes a crank drive and a stepper shaft, the stepper motor driving the stepper shaft, the stepper shaft driving the crank, the crank translating the filter mount, the stepper shaft having coupler means to permit relative movement between the filter mount and crank on the one hand and the stepper motor on the other in response to focusing movement of the lens.

28. The scanner claimed in claim 22 including a fan to cool the light source, the fan and light source being remove from the slide carriage so that heat from the light source does not deflect the slide.

* * * * *